May 2, 1961 L. E. CURRISTON ET AL 2,982,510
SHOCK AND VIBRATION ISOLATOR
Filed Feb. 4, 1957
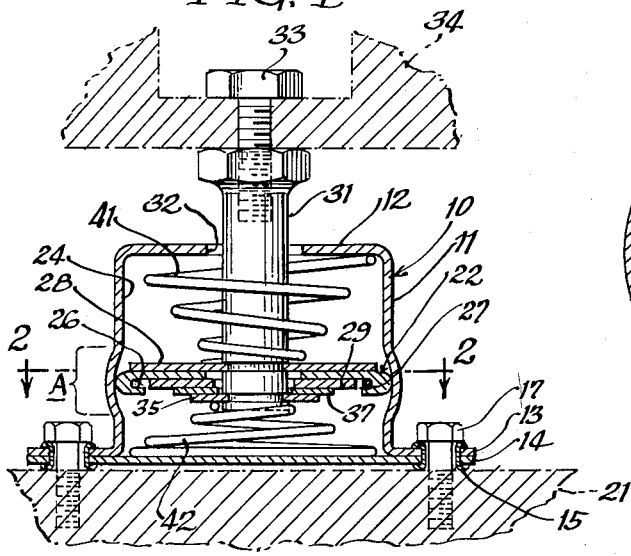
FIG. 1
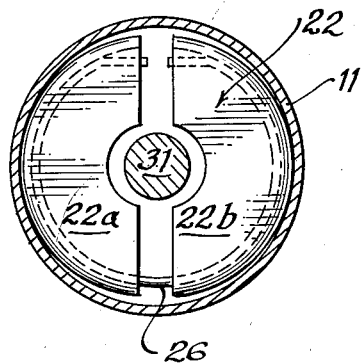
FIG. 2
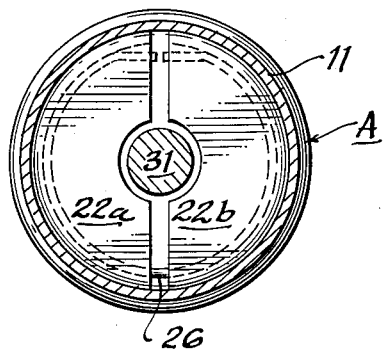
FIG. 3
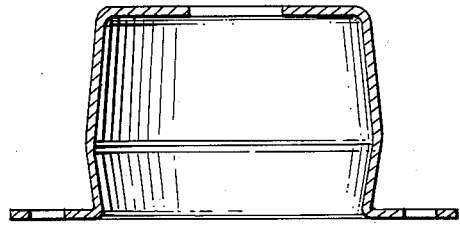
FIG. 4
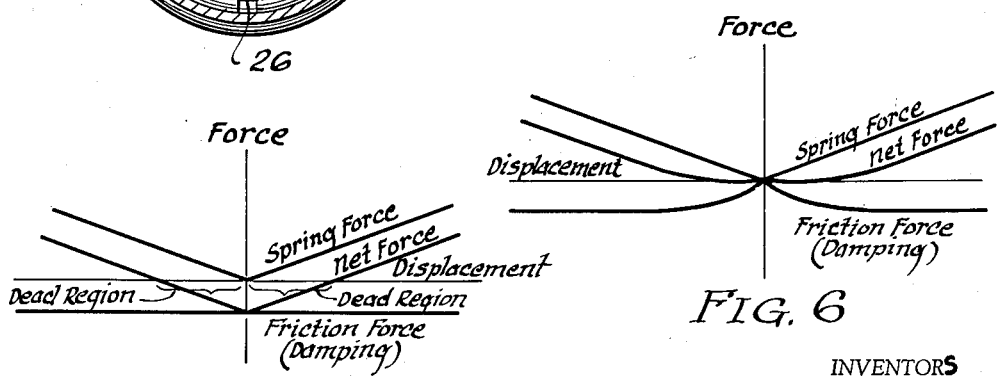
FIG. 5
FIG. 6
INVENTORS
Loren E. Curriston
BY
Leonard S. Knox
Attorney

United States Patent Office 2,982,510
Patented May 2, 1961

2,982,510
SHOCK AND VIBRATION ISOLATOR

Loren E. Curriston, Grand Rapids, Mich., and Albert de Boer, Syosset, N.Y.; said Curriston assignor to Lear, Incorporated Filed Feb. 4, 1957, Ser. No. 638,140

17 Claims. (Cl. 248—358)

This invention relates to a device for isolating a mass from the displacing effect arising out of shock and vibratory movement of a body upon which the mass is to be supported. In the art a device of this character is generally referred to as a shock mount or an isolator. One field of application is the mounting of sensitive instruments on the frame of an aircraft wherein shock and vibration are major factors to be considered.

Isolators are known which comprise a housing having a cylindrical, interior wall of uniform diameter within which a piston is adapted to reciprocate. The housing is secured to one of the parts, e.g. the frame of an airplane and an axial extension of the piston is secured to the instrument which is to be isolated. Compression springs are interposed between the opposite faces of the piston and the corresponding opposite ends of the housing whereby vibration is absorbed by deflection of the springs. Frictional damping is obtained by diametrical splitting of the piston and the employment of a spring to urge the halves thereof into frictional contact with the wall of the cylinder.

In general in shock mounts as aforesaid the spring and mass combination is selected to result in a resonant frequency which is removed from the range of operating frequencies. Usually the resonant frequency is below the working range which results in large amplitudes near resonance, viz. serious attenuation of the isolator's ability to absorb vibration falling in this region. In order to increase the attenuation near resonance it has been the practice to introduce friction damping. The restoring effect of the springs is a minimum at the no oscillation or null position of the piston while the frictional damping force remains substantially constant. When oscillations or shocks are removed, the final position of the piston relative to the housing is indeterminate. If the shock mount is used (for example) to support a gyroscope, the relative rest or null positions of the different shock mounts will cause the gyroscope to come to rest in a tilted position which causes the gyroscope to indicate an error.

Our invention has for its principal object the provision of a shock mount including frictional damping which is automatically varied as a function of displacement.

Another object is to provide a shock mount in accordance with the foregoing object in which the frictional damping force is always less than the spring-restoring force in order that, at any point of the stroke, the spring is able to return the piston to null with negligible lag.

A further object is to attain the foregoing objects in connection with presently available commercial forms of shock mount by incorporating such improvements therein as do not interfere with present dimensions, load-carrying capacities, and mounting features.

Other objects will appear from the following description which, taken with the accompanying drawing, illustrates certain forms in which the invention may be embodied in practice.

In this drawing:

Fig. 1 is a vertical, medial cross section of a device in accordance with the invention;

Fig. 2 is a cross section taken on the line 2—2 of Fig. 1;

Fig. 3 is a similar cross section to Fig. 2 but with the piston in contact with a portion of the cylinder away from the enlarged zone A;

Fig. 4 shows a modification of the invention but omitting the obviously duplicated parts of Fig. 1; and Figs. 5 and 6 are graphs to assist in understanding the behaviour of the invention.

Broadly regarded the invention comprises a shock mount which includes a housing having a cylindrical chamber with the wall of which an axially-movable piston is arranged for frictional contact. The housing is adapted for securement to one of the two bodies between which isolation is to be effected, e.g. the frame of an aircraft while the piston is adapted for securement to the other body, e.g. the frame of an instrument. Springs are interposed between each face of the piston and a respective end of the housing for absorbing vibration in both directions of excursion of the housing, or the piston, as the case may be depending upon which one of the bodies carries these respective parts of the shock mount. Generally speaking, the piston, since it has the lighter mass, is secured to the instrument. Frictional damping of proportioned magnitude is obtained by splitting the piston in a diametrical direction and by providing bias means for urging the halves into frictional contact with the wall of the cylinder and also by providing in the diameter of the cylinder an enlargement which is a maximum in a plane corresponding to the null position of the piston and which diminishes in both axial directions from that plane. Each shock mount is designed to carry a predetermined static load. The null or average relative position of the shock mount of this invention is preferably predetermined under no shock, no oscillation conditions with the rated load attached to the shock mount. It is to be observed, however, that the rated static load could conveniently be zero so that the shock mounts would have a null position when they are oriented normal to the gravity forces.

Thus, turning to the drawing we have shown a housing 10 constituted (for example) as an inverted cup including a lateral wall 11, an annular top wall 12 and a mounting flange 13. A base 14 is riveted to the flange 13, as by eyelets 15 through which cap screws 17 may be passed for attaching the housing to a support 21.

A piston 22 is constituted of two substantially semi-annular halves 22a and 22b adapted to bear on the interior face 24 of the wall 11. For convenience herein the space defined by the wall 11 will sometimes be referred to as a chamber. Desirably the piston 22 comprises nylon which affords a long-wearing friction surface without danger of scoring the companion surface or binding. The halves 22a and 22b are continually urged outwardly against the surface 24 by suitable bias means, e.g. a C-spring 26 received in a groove 27.

Axial alignment of the piston halves 22a and 22b is assured by an upper washer 28 and a lower washer 29. An extension or stud 31 of the piston exits through the opening 32 of the wall 12 and is adapted, at its outer extremity, to receive a screw 33 whereby the isolated body 34 may be attached. It will be understood that, in practice, a plurality of isolators are interposed between the bodies 21 and 34. A nut 35 is threaded on the inner end of the extension 31 to maintain the washers 28 and 29 and the piston 22 in operative position. A resilient cup washer 37 is introduced between the nut 35 and washer 29 to permit radially inward and outward lateral shifting movement of the halves 22a and 22b. It will be understood that the restoring force of the spring 26 must exceed the radial force component of the cup washer 37.

Suitable elastic means, such as springs, are mounted between the opposing faces of the piston and opposite ends of the housing, respectively. For example, we have shown a pair of conically shaped, coiled, compression springs 41 and 42. If desired seats may be provided at one or both ends of the springs 41 and 42 to insure constant centering thereof.

In accordance with the invention a peripheral zone of the wall 24 in the region of the null position of the piston 22 is enlarged in interior diameter as indicated at A. In the case where the housing is of readily deformable material the wall may be bulged as required by the use of suitable dies. Where the housing is incapable of being die-formed the enlargement may be introduced by machining. In any event the increase of diameter is a maximum in a plane which is the radial mid plane of the piston at the null position thereof and this diameter is gradually reduced in both directions toward the ends of the cylinder. While, in Fig. 1 the enlargement A is shown as a peripherally extended concavity of uniform axial width on the interior face of lateral wall 11, the same may be otherwise constituted depending upon the relation desired between the restoring force of the springs 41 and 42 and the damping friction force which will provide maximum damping with minimum hysteresis. Obviously, in most cases, the relation will be empirically established following suitable tests in a vibration simulating apparatus and with specific instruments carried on the shock mounts. One desirable shape of the peripheral zone A is found that to be defined by a surface which is the equatorial zone of a sphere.

An alternative construction is depicted in Fig. 4 wherein the peripheral zone enlargement is in the form of a pair of frusto-conical surfaces placed base-to-base, the meeting plane being at the radial mid-plane of the piston when in its null position.

Inasmuch as the friction of the piston on the cylinder wall is a function of the force of the C-spring 26 it follows that the damping force decreases inversely proportionately to the extension of the spring and that this latter exerts minimum force when the piston halves are extended to the maximum spacing.

In order to clarify the invention in its relation to prior art devices we have illustrated the behaviour thereof by the graphs of Figs. 5 and 6. In the prior devices whose characteristics are graphed in Fig. 5, the spring force is seen as a linear function and the constant damping force as a straight line parallel to and below the displacement axis. The net difference between the two valves for both negative and positive displacement from the null is therefore also a linear function which results in a region on both sides of null in which the friction force is greater than the spring force. This means that when a shock or oscillation force is removed from the prior art device, the final position of the piston is indeterminate within the region marked "dead region" in Fig. 5.

In the graph of Fig. 6 the variable friction force resulting from the invention improvement is seen to provide a net spring force at all values of displacement with consequent elimination of ambiguity in the rest or null position of piston 22.

While we have shown certain embodiments of our invention, it will be understood, of course, that we do not wish to be limited thereto since many modifications may be made and we therefore contemplate by the appended claims to cover any such modifications as fall within the true spirit and scope of our invention.

We claim:

1. A shock and vibration isolator for interposition between a first and second body having relative displacement in the direction of a predetermined axis comprising: a housing, including mounting means for securing said isolator to said first body, said housing having a lateral wall defining a chamber which is circularly symmetrical about said axis; a piston, positioned and adapted to move axially in said housing, said piston being split along radial lines into a plurality of segments; means for connecting said piston to said second body; first bias means for urging said segments of said piston radially outward against said lateral wall; said lateral wall having an enlarged interior diameter in a peripheral zone extending on either side of a predetermined null position to cause the friction of said piston on said wall to be varied as a predetermined function of the varying diameter contacted by said piston; and second elastic bias means interposed between at least one face of said piston and the end of said housing adjacent said face for maintaining said piston, in cooperation with said enlarged diameter and said piston segments, in said axial null position.

2. An isolator in accordance with claim 1 wherein said peripheral zone is defined by a surface which is an equatorial zone of a sphere.

3. An isolator in accordance with claim 1 wherein said peripheral zone is constituted as a peripherally extended concavity of uniform axial width on the interior face of said lateral wall.

4. An isolator in accordance with claim 1 wherein the interior of said lateral wall of said chamber is of maximum diameter at a predetermined axial position which defines the null position of said piston and is of gradually decreasing diameter from said maximum toward both ends of said housing.

5. An isolator in accordance with claim 1 wherein said peripheral zone is defined by a pair of frusto-conical surfaces placed base-to-base.

6. An isolator in accordance with claim 1 wherein said first bias means is a C-spring and said segments are provided with grooves, said C-spring being received in said grooves.

7. Means for supporting a first mass in a predetermined average relative position with respect to a second mass comprising elastic means connecting said first mass to said second mass and supplying a force between said masses proportional to their displacement from said average relative position, and damping means supplying a second force between said masses in opposition to said first force and of magnitude always less than said first force.

8. An isolator according to claim 1, wherein said second bias means is interposed between said piston and the end of said housing opposite to said second body.

9. A shock and vibration isolator for interposition between a first and second body having relative displacement in the direction of a predetermined axis comprising: a housing defining a chamber having a longitudinal axis and a lateral wall symmetrical about said axis, including a mounting means for securing said isolator to said first body; a piston having a first and second face, movable axially in said chamber, and having a part for securing said piston to said second body; first bias means interposed between said first face of said piston and the end of said housing adjacent said first face; second bias means interposed between said second face of said piston and the end of said housing adjacent said second face; said first and second bias means being positioned and biased to maintain a predetermined axial null position of said piston; said piston being split along radial lines into a plurality of segments and being provided with third bias means for urging said segments into frictional contact with said lateral wall; and means for varying the magnitude of the frictional force between said piston and said wall as a function of the displacement of said piston from said null position.

10. An isolator in accordance with claim 9 wherein said means for varying the magnitude of the frictional force between said piston and said wall is an enlarged interior diameter in a peripheral zone extending on either side of said null position.

11. An isolator in accordance with claim 10 wherein said peripheral zone is defined by a surface which is an equatorial zone of a sphere.

12. An isolator in accordance with claim 10 wherein said peripheral zone is constituted as a peripherally extended concavity of uniform axial width on the interior face of said lateral wall.

13. An isolator in accordance with claim 10 wherein the interior of said lateral wall of said chamber is of maximum diameter at a predetermined axial position which defines the null position of said piston and is of gradually decreasing diameter from said maximum toward both ends of said housing.

14. An isolator in accordance with claim 10 wherein said peripheral zone is defined by a pair of frusto-conical surfaces placed base-to-base.

15. An isolator in accordance with claim 10 wherein said third bias means is a C-spring and said segments are provided with grooves, said C-spring being received in said grooves.

16. A shock and vibration isolator for interposition between a first and second body having relative displacement in the direction of a predetermined axis comprising: a housing, including mounting means for securing said isolator to said first body, said housing having a lateral wall defining a chamber which is circularly symmetrical about said axis; a piston, positioned and adapted to move axially in said housing, said piston being split along radial lines into a plurality of segments; means for connecting said piston to said second body; first bias means for urging said segments of said piston radially outward against said lateral wall to provide continual frictional contact between said piston and said wall during movement of said piston relative to said wall; said lateral wall having an enlarged interior diameter intermediate its ends in a peripheral zone extending on either side of a predetermined null position to cause the friction of said piston on said wall to be varied as a predetermined function of the varying diameter contacted by said piston; and second elastic bias means interposed between at least one face of said piston and the end of said housing adjacent said face for maintaining said piston in cooperation with said enlarged diameter and said piston segments, in said axial null position.

17. A shock and vibration isolator for interposition between a first and second body having relative displacement in the direction of a predetermined axis comprising: a housing defining a chamber having a longitudinal axis and a lateral wall symmetrical about said axis, including a mounting means for securing said isolator to said first body; a piston having a first and second face, movable axially in said chamber, and having a part for securing said piston to said second body; first bias means interposed between said first face of said piston and the end of said housing adjacent said first face; second bias means interposed between said second face of said piston and the end of said housing adjacent said second face; said first and second bias means being positioned and biased to maintain a predetermined axial null position of said piston; said piston being split along radial lines into a plurality of segments and being provided with third bias means for urging said segments into continual frictional contact with said lateral wall; and means for increasing the magnitude of the frictional force between said piston and said wall as a function of the displacement of said piston from said null position.

References Cited in the file of this patent

UNITED STATES PATENTS

| | | |
|---|---|---|
| 1,639,336 | Gannett | Aug. 16, 1927 |
| 1,802,589 | Thompson | Apr. 28, 1931 |
| 1,983,522 | Coultas | Dec. 11, 1934 |
| 2,365,989 | Ailes | Dec. 26, 1944 |
| 2,658,710 | Titus | Nov. 10, 1953 |
| 2,683,016 | Campbell | July 6, 1954 |
| 2,705,606 | Triplett | Apr. 5, 1955 |
| 2,841,388 | Hehn | July 1, 1958 |

OTHER REFERENCES

Barry Controls Advertisement, Product Engineering, May 1956. (Copy in Div. 52.)